(12) United States Patent
Schaaf et al.

(10) Patent No.: US 7,558,715 B2
(45) Date of Patent: Jul. 7, 2009

(54) METHOD FOR QUICKLY FORMING A STOCHASTIC MODEL REPRESENTATIVE OF THE DISTRIBUTION OF A PHYSICAL QUANTITY IN A HETEROGENEOUS MEDIUM BY SUITABLE SELECTION OF GEOSTATISTICAL REALIZATIONS

(75) Inventors: Thomas Schaaf, Rueil-Malmaison (FR); Guy Chavent, Maisons-Laffitte (FR); Mokhles Mezghani, Rueil Malmaison (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/549,193

(22) PCT Filed: Mar. 16, 2004

(86) PCT No.: PCT/FR2004/000644

§ 371 (c)(1),
(2), (4) Date: May 8, 2006

(87) PCT Pub. No.: WO2004/086280

PCT Pub. Date: Oct. 7, 2004

(65) Prior Publication Data

US 2006/0241925 A1    Oct. 26, 2006

(30) Foreign Application Priority Data

Mar. 18, 2003    (FR) .................................. 03 03276

(51) Int. Cl.
*G06G 7/48*    (2006.01)
(52) U.S. Cl. ........................................................ 703/10
(58) Field of Classification Search .................... 703/2, 703/10; 702/6
See application file for complete search history.

(56) References Cited

U.S. PATENT DOCUMENTS 5,838,634 A    11/1998    Jones et al.

(Continued)

OTHER PUBLICATIONS

Chavent et al.: Indicator for the refinement of parameterization; International Symposium on Inverse Problems; pp. 1-7; 1998.*

(Continued)

*Primary Examiner*—Hugh Jones
(74) *Attorney, Agent, or Firm*—Antonelli, Terry, Stout & Kraus, LLP.

(57) ABSTRACT

A method having an application to production problems in reservoir engineering for quickly forming a stochastic model representative of the distribution of a physical quantity in a porous heterogeneous medium, which is calibrated in relation to dynamic data, by suitable selection of geostatistical realizations to be combined linearly. An iterative gradual deformation process is used, wherein an initial geostatistical realization (y) of the medium and a number $(N-1)(N>1)$ of other realizations $(z_i)i=1, \ldots, (N-1)$, which are independent of initial realization (y), are linearly combined at each iteration, by applying constraints to the linear combination coefficients of realizations (y) and $(z_i)i=1, \ldots, (N-1)$, and an objective function (J) measuring the difference between a set of simulated data deduced from said combination by means of a simulator and said dynamic data is minimized. To quickly minimize the objective function, the Lagrange multiplier $(\lambda)$, $\lambda \in R^{N-1}$ associated with the constraint relating to the specified values of the coefficients of realizations $(z_i)i=1, \ldots, (N-1)$ is calculated. The absolute value $\lambda_i$ of the $i^{th}$ component of multiplier $\lambda$ indicates the sensitivity of the objective function in relation to the $i^{th}$ geostatistical realization $(z_i)$.

20 Claims, 2 Drawing Sheets

U.S. PATENT DOCUMENTS

| | | | |
|---|---|---|---|
| 6,480,790 B1 * | 11/2002 | Calvert et al. | 702/14 |
| 6,549,879 B1 * | 4/2003 | Cullick et al. | 703/10 |
| 6,662,109 B2 * | 12/2003 | Roggero et al. | 702/6 |
| 2002/0159617 A1 | 10/2002 | Hu | |

OTHER PUBLICATIONS

Clayton V. Deutsch et al., "Geostatistical Techniques Improve Reservoir Management", Hart Publications, vol. 69, No. 3, Mar. 1, 1996, pp. 21-22, 24-27.

F. Roggero et al., "Gradual Deformation of Continuous Geostatistical Models for History Matching", Sep. 27, 1998, pp. 221-236, XP002186720.

D. Rahon et al., "Gradients Method Constrained by Geological Bodies for History Matching", vol. Omega, Oct. 6, 1996, pp. 841-850, XP002089308.

* cited by examiner

New initial point

METHOD FOR QUICKLY FORMING A STOCHASTIC MODEL REPRESENTATIVE OF THE DISTRIBUTION OF A PHYSICAL QUANTITY IN A HETEROGENEOUS MEDIUM BY SUITABLE SELECTION OF GEOSTATISTICAL REALIZATIONS

BACKGROUND OF THE INVENTION

1. Field of the Invention

The present invention relates to a method for quickly forming a stochastic model representative of the distribution of a physical quantity such as the permeability, for example, in a porous heterogeneous medium, which is calibrated in relation to dynamic data, by suitable selection of linearly combined geostatistical realizations.

2. Description of the Prior Art

Optimization in a stochastic context determines realizations of a stochastic model which satisfy a set of data observed in the field. In reservoir engineering, the realizations to be identified correspond to representations, in the reservoir field, of the distribution of carrying properties such as the permeability or the porosity. These realizations form numerical reservoir models. The available data are, for example, punctual permeability or porosity measurements, a spatial variability model determined according to punctual measurements or data directly related to the fluid flows in an underground reservoir, that is pressures, breakthrough times, flow rates, etc. The latter are often non linearly related to the physical properties to be modelled. A randomly drawn realization is generally not in accordance with the whole of the data collected. Coherence in relation to the data is ensured in the model by means of an inverse procedure.

Studies integrated in reservoir engineering mainly have two objectives:

On mature fields, the reservoir engineer tries to quantify the uncertainties linked with the production forecasts;

On projects under development or entering into a new production stage, the reservoir engineer wants to be able to test various production scenarios in order to make risk studies.

In this context, the use of geostatistics as estimation methods as well as stochastic simulation methods has become common practice. Current geostatistical simulation tools allow quickly generating oil reservoir models containing several million grid cells. The challenges linked with the use of such models are mainly of two orders:

[1] On the one hand, it must be possible to integrate the available data to update the reservoir model while ensuring conservation of the geostatistical properties of the initial geological model;

[2] On the other hand, the inverse problem associated with this data integration has to be solved within time limits compatible with the economic constraints.

In both cases, parameterization of the geological model plays an essential part. A conventional approach reduces the number of parameters and accounts only for those having a maximum sensitivity. The pilot point method initially presented by:

Ramarao, B. S., LaVenue, A. M., de Marsily, G. & Marietta, M. G., "Pilot Point Methodology for Automated Calibration of an Ensemble of Conditionally Simulated Transmissivity Fields: 1. Theory and Computational Experiments", Water Resources Research, 31(3): 475-493, Mar. 1995 allows performing a historical matching on a reservoir model parameterized by the well data and a certain number of pilot points specified by the user. Updating of the model is however located in the neighborhood of the pilot points.

The method of zoning the reservoir into main units or zones having constant petrophysical properties has been initially presented by:

Bissel, R., "Calculating Optimal Parameters for History Matching", Proceedings of the 4th European Conference on the Mathematics of Oil Recovery (ECMOR IV), 1994.

It allows historical matching to be performed as long as the zonation selected is correct from a geological point of view. Point [1] is however not respected.

Another approach lies in the multiscale parameterization for which the problem is solved successively on increasingly fine scales. It has the drawback of generally leading to an overparameterization because all the degrees of freedom of the lower scale are used, whereas only some of them would be necessary to explain the data.

Adaptive multiscale approaches allow this drawback to be corrected. The concept of refinement indicator presented by:

Chavent, G., & Bissell, R., "Indicator for the Refinement of Parameterization", Proceedings of the International Symposium on Inverse Problems in Engineering Mechanics, Nagano, Japan, p. 185-190, 1998 allows identification of the degrees of freedom useful for explaining the data while avoiding the trap of overparameterization.

More recently, a geostatistical parameterization technique has been introduced to constrain, by gradual deformation, the stochastic realizations to data on which they depend non-linearly. It is the object of French patents 2,780,798 and 2,795,841 filed by the assignee. It is also described in the following publication:

Roggero, F., & Hu, L. Y., (1998), "Gradual Deformation of Continuous Geostatistical Models for History Matching", SPE 49004.

It allows performing history matching while keeping the initial geostatistical properties of the reservoir model. Parameterization then amounts to the gradual deformation parameters from which the user calculates the coefficients of the linear combination. The geological model being parameterized by a linear combination of geostatistical realizations, point [1] can be satisfied by a specific constraint on the coefficients of this linear combination.

Point [2] involves two other conditions from the moment that the gradual deformation method is used. The issue is to know:

[3] Which number N of geostatistical realizations is to be considered for the linear combination, and

[4] How to select as efficiently as possible the N optimum geostatistical realizations (fastest decrease of the objective function of the inverse problem considered).

A conventional approach concerning point [3] carries out a decomposition into eigenvalues and eigenvectors. The different eigenvalues obtained allow finding a compromise between the uncertainty obtained on the parameters at the end of the calibration and the number of parameters that can be estimated from the available data.

According to another approach, still within the context of a parameterization using the gradual deformation method, it is considered that any geostatistical realization still is a contribution, even if it is minimal, to the decrease of objective function (J). Consequently, a certain number of optimum geostatistical realizations are linearly combined by means of the gradual deformation method. These optimum realizations themselves result from a linear combination of initial geostatistical realizations whose combination coefficients are so selected as to provide a gradual deformation search direction that is as close as possible to the direction of descent given by the gradients. This approach forms the object of French patent application 02/13,632 filed by the assignee.

Concerning point [4], no approach has been proposed to date allowing making an a priori selection of the realizations (or maps) used in the linear combination within the context of history matching. Only a technique allowing an a priori selection of the geostatistical realizations corresponding to the extreme production scenarios within an uncertainty quantification context has been proposed by:

Roggero, F., "Direct Selection of Stochastic Model Realizations Contrained to Historical Data", SPE 38731, 1997.

SUMMARY OF THE INVENTION

The method according to the invention allows formation of a Gaussian or Gaussian-related stochastic numerical model giving an image of the distribution of a physical quantity in a porous heterogeneous medium, which is calibrated in relation to data obtained by means of measurements performed in the medium or prior observations, and characteristic of the fluid displacement in the medium. It comprises an iterative gradual deformation process wherein an initial geostatistical realization (y) of at least part of the medium and a number (N−1) (N>1) of other realizations independent of the initial realization are linearly combined, at each iteration, by applying constraints to the linear combination coefficients, and an objective function measuring the difference between a set of non linear data deduced from the combination by means of a simulator and the dynamic data is minimized, the iterative process being repeated until an optimum realization of the stochastic model is obtained.

In order to select the geostatistical realizations so as to quickly minimize the objective function and to obtain faster convergence of the model, a certain number $N^\#$ of realizations, much greater than number N, is generated and the realizations having indicators of larger absolute value are selected from among them until N maps are eventually obtained, the indicator associated with each realization corresponding to a scalar product between this realization and the geostatistical gradient of the objective function in relation to the initial geostatistical realization considered.

According to an implementation mode, in addition to the arbitrarily selected initial geostatistical realization (y), the other (N−1) realizations are selected from the (N−1) indicators of larger absolute value. In this case, the geostatistical gradient of the objective function is considered in relation to the data-conditioned initial geostatistical realization (y).

According to an implementation mode, the N realizations are selected from the N indicators of larger absolute value. In this case, the geostatistical gradient of the objective function is considered in relation to the geostatistical realization of the zero random variable conditioned to the static well data.

The geostatistical gradient are determined by means of the adjoint state method.

The geostatistical gradient may be determined by a adjoint state method or calculated by a transition facies technique, when the physical quantity is discontinued.

The refinement indicators may be used to initialize an optimization algorithm with optimum and non zero initial gradual deformation parameters.

When linear combining of each iteration affects only part of the initial realization, the iterative gradual deformation is applied to Gaussian white noise used to generate a Gaussian realization and further comprises determining a geostatistical gradient, derivative of an objective function in relation to components of the Gaussian white noise.

BRIEF DESCRIPTION OF THE DRAWINGS

Other features and advantages of the method according to the invention will be clear from reading the description hereafter of a non limitative example, with reference to the accompanying drawings wherein.

DETAILED DESCRIPTION OF THE INVENTION

Figure 1:
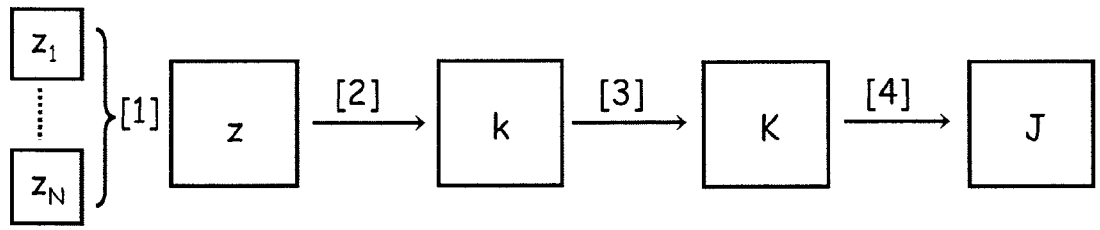
FIG. 1 shows the main stages of the direct problem when the gradual deformations are used as parameterization of the geological model.

A production history matching is performed on a reservoir model (on the geological or flow simulation scale) parameterized by means of the gradual deformation method. This method optimises iteratively a linear combination of independent realizations of the stochastic model until the dynamic constraints are respected (via an objective function).

The petrophysical properties (such as the permeability or the porosity) of the reservoir model are modelled by a random function Z. Specifically a reduced centered Gaussian random function Z(x) is considered. The gradual deformation method writes a new realization z of Z as a linear combination of N independent realizations $z_i$ of Z:

$$z(\rho) = \sum_{i=1}^{N} \rho_i z_i \text{ with } \sum_{i=1}^{N} \rho_i^2 = 1 \qquad (1)$$

The normality constraint is automatically verified when working with spherical coordinates $\{\theta_1, \ldots, \theta_{N-1}\}$. The new realization z is then a function of (N−1) independent gradual deformation parameters $\{\theta_1, \ldots, \theta_{N-1}\}$ calculated by means of a relation:

$$\rho = S(\theta) \qquad (2)$$

The concept of refinement indicators has been applied to the parameterization by gradual deformation. In practice, a number N (generally small) of realizations $z_i \in R^{nm}$ is randomly selected, where nm corresponds to the number of geostatistical grid cells (generally large). The optimization algorithm is initialized with spherical coordinates θ=0. This amounts to initializing the coefficients of the linear combination [Eq. (1)] at $\rho_1=1, \rho_2=\ldots=\rho_N=0$. The use of refinement indicators allows the user to reduce to one or even zero the number of randomly selected geostatistical realizations.

Case 1: Random Selection of a Geostatistical Realization $z_1$

Once the initial realization $z_1$ has been selected, the user chooses the (N−1) realizations $z_2 \ldots z_N$ used in the gradual deformations from among a set of $N^{\#}$ ($N^{\#}$>>N) realizations $z_2 \ldots z_{N\#}$. The idea is to generate realizations $z_2 \ldots z_{N\#}$ from a large number of random terms and to take into account, for the gradual deformation, only the (N−1) realizations having the largest refinement indicators $\lambda_i$ that we define now.

Let $\rho = (\rho_1, \ldots, \rho_{N\#})$, and consider the constrained optimization problem as follows:

$$\begin{cases} \text{Find } \rho^* \in R^{N^\#} \text{which minimizes}(J)z \text{ with } z = \sum_{i=1}^{N^\#} \rho_i z_i \\ \text{with the constraints} \\ [A]\rho_i = b_i, i = 2 \ldots N^\#, [B]\sum_{i=1}^{N^\#} \rho_i^2 = 1 \end{cases} \quad (3)$$

where $b_i$, $i=2 \ldots N^{\#}$ are specified numbers such that $\Sigma_{i=2}^{N^\#} b_i^2 < 1$. Any local solution $\rho^*$ to (3) meets the associated necessary Lagrange condition; then $\lambda^* = (\lambda^*_2 \ldots \lambda^*_{N^\#})$ (multipliers for constraint [A]) and $\mu^*$ (multiplier for constraint [B]) such that:

$$\frac{\partial L}{\partial \rho}(\rho^*, \lambda^*, \mu^*) = 0 \quad (4)$$

where L is the Lagrangian defined by:

$$\begin{cases} L(\rho, \lambda, \mu) = J\left(\sum_{i=1}^{N^\#} \rho_i z_i\right) + \sum_{i=2}^{N^\#} (\rho_i - b_i)\lambda_i + \left(\sum_{i=1}^{N^\#} \rho_i^2 - 1\right)\mu \\ \forall \rho = (\rho_1 \ldots \rho_{N^\#}), \forall \lambda = (\lambda_2 \ldots \lambda_{N^\#}), \forall \mu \end{cases} \quad (5)$$

Formula (4) immediately gives us the Lagrange multipliers:

$$\lambda_i^* = -\left\langle \frac{\partial J}{\partial z}(z^*), z_i \right\rangle_{R^{nm}} i = 2 \ldots N^\#, \text{ with } z^* = \sum_{i=1}^{n^\#} \rho_i^* z_i \quad (6)$$

The geostatistical gradient $\partial J/\partial z(z^*) \in R^{nm}$ corresponds to the derivative of objective function J in relation to each geostatistical cell of realization $z^*$. The solution $\rho^*$ to (3), as well as the associated geostatistical realization $z^*$ and the Lagrange multipliers $\lambda^*, \mu^*$, depend on the second member $b=(b_2 \ldots b_N^{\#})$ of constraint [1], so that they can be denoted by $\rho_b^*, z_b^*, \lambda_b^*$ and $\mu_b^*$. The (optimum) minimum value of the objective function associated with second member b is thus:

$$J_b^* = J(z_b^*) \quad (7)$$

A known constrained optimization result shows that the Lagrange multiplier $\lambda_i^*$ coincides with the derivative of the optimum objective function $J_b^*$ in relation to the $i^{th}$ element $b_i$ of the second member of the constraint:

$$\frac{\partial J_b^*}{\partial b_i} = -\lambda_i^* \quad (8)$$

To apply this result to the problem, it is observed that, for selection $b_2 = b_3 = \ldots = b_N^{\#} = 0$, the space of the solutions to problem (4) contains only two isolated points $\rho = (\pm 1, 0, \ldots, 0) \in R^{N\#}$, which thus are local solutions to (4)! Therefore an applying of the previous analysis with $\rho^* = (1, 0, \ldots, 0)$ and $z^* = z_1$ is made. If denote by $J(z^{\otimes})$, the minimum value of objective function J when the $i^{th}$ element of second member b changes from $b_i = 0$ to $b_i = \delta b_i$, it is seen that, at the first order:

$$J(z^{\otimes}) - J(z^*) = -\lambda_i^* \delta b_i \quad (9)$$

The $i^{th}$ component $\lambda_i$ of the Lagrange multiplier $\lambda$ thus shows the sensitivity of optimum objective function $J_b^*$ when the $i^{th}$ degree of freedom is taken into account, that is the $i^{th}$ realization $z_i$ is used for parameterization of the gradual deformations. From now on these Lagrange multipliers are referred to as refinement indicators for the gradual deformations.

In order to select, from among the $N^{\#}$ candidate realizations, the N−1 that must be associated with $z_1$ to use the gradual deformations, the $N^{\#}-1$ refinement indicators $\lambda_2 \ldots \lambda_{N^\#}$ are calculated by means of formula 6. This is done extremely quickly, given that each $\lambda_i$ corresponds to a simple scalar product, once the geostatistical gradient $\partial J/\partial z(z^*) \in R^{nm}$ has been calculated (see next paragraph). The refinement indicators are then sorted in decreasing order according to their absolute value and we select the (N−1) geostatistical realizations corresponding to the (N−1) refinement indicators of largest absolute value.

Case 2: Avoid Random Selection of Geostatistical Realization $z_1$

Suppose that the petrophysical properties (such as the permeability or the porosity) of the reservoir model are modelled by a lognormal distribution $Y(x)$ of mean m and of variance $\sigma^2$. This realization $Y(x)$ is related to a normal distribution $U(x)$ of mean m' and of variance $\sigma'^2$ through the relation:

$$Y(x) = e^{U(x)} \quad (10)$$

The gradual deformations use a reduced centered random variable $Z(x)$. Equation 10 can then be rewritten as follows:

$$Y(x) = e^{(m' + \sigma' Z(x))} \quad (11)$$

Instead of calculating the geostatistical gradient $\partial J/\partial z$ for a randomly selected realization $z_1$ (case 1), the user evaluates gradient $\partial J/\partial z$ for the zero random variable $Z \equiv 0$ conditioned to the static well data. The motivation is due to the fact that, if an infinity of realizations was taken into account in the linear combination [Eq. (1)], the resulting realization would be equal to mean $e^{m'}$, that is equation (11) with $Z \equiv 0$. This gradient gives the sensitivity of the objective function for a deterministic distribution equal to the mean of the distribution conditioned to the static well data.

In order to select the N realizations used in the gradual deformations, in case 1 a large number $N^{\#}$ of geostatistical realizations are generated and the initialization indicators for the gradual deformations are calculated:

$$\Lambda_i = \left(\frac{\partial J}{\partial z}(0), z_i\right)_{R^{nm}}, i = 1 \ldots N^{\#} \quad (12)$$

By definition:

$$J(\delta\rho_i z_i) - J(0) \approx \Lambda_i \delta\rho_i, i = 1 \ldots N^{\#} \quad (13)$$

Realizations $z_i$ having a large absolute value $|\Lambda_i|$ can potentially significantly decrease the objective function for a $\delta\rho_i$ of correct sign. The user sorts out in decreasing order of absolute value the initialization indicators and selects for the gradual deformation the N realizations having the largest absolute value.

Calculation of Geostatistical Gradient $\partial J/\partial z$

The stage prior to calculation of the refinement indicators [Eq. (6)] in calculating geostatistical gradient $\partial J/\partial z$. First considered are the various stages of the direct problem when the gradual deformations are used as parameterization of the geological model (FIG. 1).

The successive four stages are:

[1] Gradual deformation of the N realizations $z_i$ resulting in realization z,

[2] Geological modelling: a case of lognormal distributions or facies models. Conditioning to the static data is achieved,

[3] Upscaling to change from the geological model to the flow simulation model if necessary,

[4] Flow simulation and calculation of objective function J.

By composite derivation, gradient $\partial J/\partial z$ is written as follows:

$$\frac{\partial J}{\partial z} = \underbrace{\frac{\partial J}{\partial K}}_{1} \underbrace{\frac{\partial K}{\partial k}}_{2} \underbrace{\frac{\partial k}{\partial z}}_{3} \quad (14)$$

One of the main points of the methodology is to calculate these gradients by means of the adjoint state method. Gradient $\partial J/\partial K$ is calculated by a discrete adjoint state. The second term can also be calculated by adjoint state if necessary. The third term corresponds to the derivation of the geological modelling stage and it can be readily calculated analytically.

With this approach, the additional cost induced by the calculation of gradient $\partial J/\partial K$ is similar to the computing cost required for calculation of objective function J—and, more important, it is independent of the number of geostatistical cells, which is very large.

Using the Indicators to Initialize the Optimization Algorithm

Equation (9) shows that the sign of the refinement indicators contains important information. Suppose that a given indicator is of positive sign. If a positive weight is fixed for the associated realization, this will tend to decrease the objective function (to the first order). The same analysis applies for negative indicators. It is therefore in the user's interest to initialize the optimization algorithm with θs giving linear combination coefficients of the same sign as the indicator under consideration.

Case 1: Random selection of a geostatistical realization $z_1$

Figure 2:
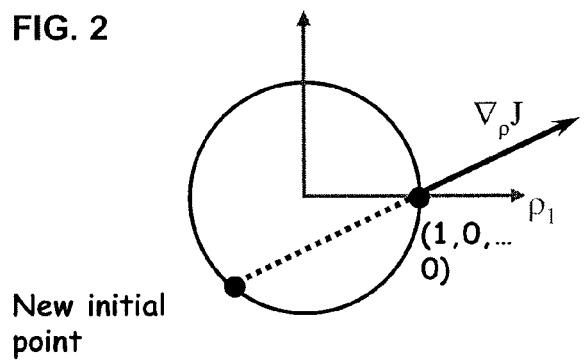
FIG. 2 is a geometric representation of the method allowing finding the best initialization point for the optimization algorithm in the case of refinement indicators for the gradual deformations.

Once the geostatistical realization $z_1$ has been selected, a determination made of the (N−1) realizations $z_2 \ldots z_N$ used for the gradual deformations using the associated refinement indicators. The calculation $\nabla_z J(z_1)$ is made and, by simple scalar product, the components $\lambda_1 \ldots \lambda_N$ of $\nabla_\rho J((1,0\ldots 0))$ are obtained. A new initial point in direction $-\nabla_\rho J$ on the sphere $\Sigma_{i=1}^{N} \rho_i^2 = 1$ may therefor be sought:

if $\lambda_1 > 0$, J tends to decrease when $\rho_1$ is increased. In this case, $\rho = (1, 0 \ldots 0)$ is the best initialization point, if $\lambda_1 < 0$, the motion in the direction $-\nabla_\rho J$ occurs until intersection of the sphere again (FIG. 2):

$$\begin{cases} \rho_1 = 1 - \varepsilon\lambda_1, \rho_2 = 0 - \varepsilon\lambda_2, \ldots, \rho_N = 0 - \varepsilon\lambda_N \\ \Rightarrow \varepsilon = \frac{2\lambda_1}{\lambda_1^2 + \ldots + \lambda_N^2} \\ \rho_1^2 + \ldots + \rho_N^2 = 1 \end{cases} \quad (15)$$

Case 2: Avoid Random Selection of Geostatistical Realization $z_1$

The calculation $\nabla_z J(z=0)$ has occurred, and $\nabla_\rho J(\rho=0) = (\Lambda_1 \ldots \Lambda_N)$ is obtained. Initialization of the optimization algorithm is by following the rules below:

$$\begin{cases} \rho_j = 0 - \varepsilon\Lambda_j, j = 1 \ldots N \\ \Rightarrow \varepsilon = \frac{1}{(\Lambda_1^2 + \ldots + \Lambda_N^2)^{1/2}} \\ \rho_1^2 + \ldots + \rho_N^2 = 1 \end{cases} \quad (16)$$

The inverse transformation $S^{-1}$ of equation (2) gives the corresponding gradual deformation parameters $\{\theta_1, \ldots, \theta_{N-1}\}$.

Extension of the Methodology to the Case of Facies Models

Facies models correspond to models showing discontinuities in physical quantities such as the permeability for example, which makes term [3] of equation (14) non derivable. A methodology proposed by:

Schaaf, T., Mezghani, M. and Chavent, G., 2002, "Direct Conditioning of Fine-Scale Facies Models to Dynamic Data by Combining Gradual Deformation and Numerical Upscaling Techniques", Paper E-44: Proc. 8$^{th}$ European Conference on Mathematics of Oil Recovery (ECMOR VIII), 3-6 Sep. 2002, Freiberg, Germany, introduces the concept of transition facies which allow having a derivable function k=f(z) and therefore to calculate term [3] of equation (14). The method according to the invention thus applies to facies models from the moment that the concept of transition facies described in this publication is used to calculate term [3] of equation (14).

EXAMPLE

A simulated example illustrating the method in a non limitative way is described.

A reservoir is considered with a Cartesian grid containing, along axes X, Y and Z respectively, 141, 141 and 4 grid cells. The only petrophysical property considered is the permeability. The permeability is modelled by a lognormal distribution of mean 100 mD and of variance (100)2 mD2. The porosity is constant in the reservoir. Since a simulated case of interference tests is considered, it therefore is a single-phase flow simulation. The only data from the flow simulator are the well pressures. The reservoir is crossed through by five wells: a producing well at the center of the model and four observation wells arranged crosswise around the producing well.

A realization generated from a random term is used as the reference model. A fluid flow simulation is carried out on this model, which gives reference well pressures. The objective function is formulated in the least squares sense. No upscaling stage is considered. The simulation is directly performed on the model considered.

Solution of the inverse problem by parameterizing the model by two gradual deformation parameters θ is attempted, that is consideration of a linear combination of three geostatistical realizations $z_i$.

For this simulated example, testing the two approaches is described in cases 1 and 2.

Case 1: Random Selection of a Geostatistical Realization $z_1$

Figure 3:
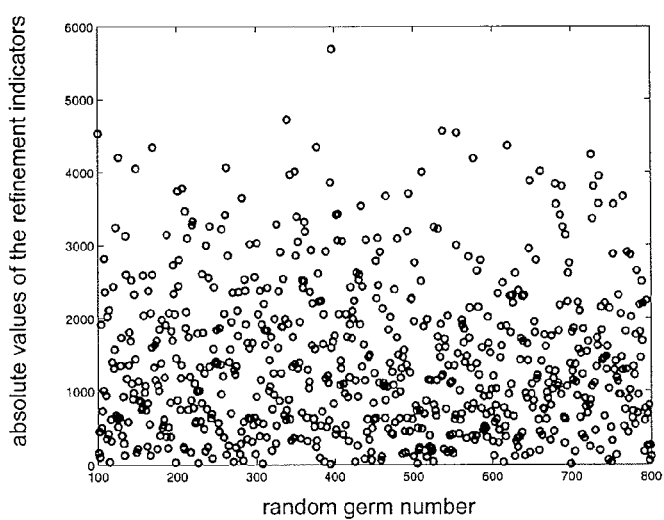
FIG. 3 shows the absolute values of the refinement indicators for the gradual deformations of 700 geostatistical realizations.

Randomly selection of a geostatistical realization $z_1$ for which calculation of a gradient $\partial J/\partial z$ is made. Generation of a set of 700 geostatistical realizations is performed for which calculation of the corresponding refinement indicators is accomplished (FIG. 3).

Figure 4:
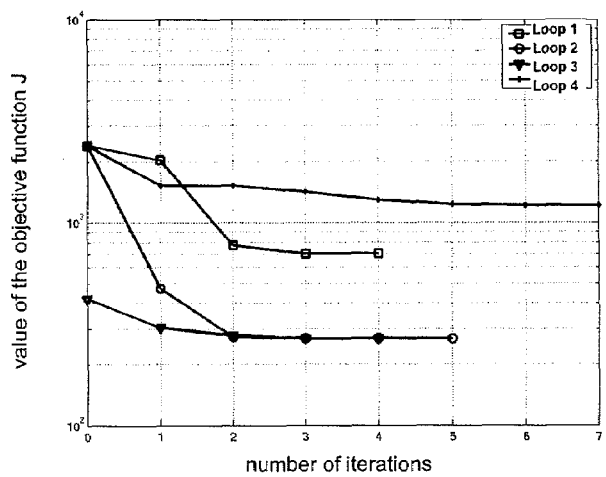
FIG. 4 shows the evolution of objective function J for four optimization loops, the geostatistical realizations used for the gradual deformations being selected or not by the refinement indicators for the gradual deformations.

In order to show the usefulness of the approach proposed, the following four optimization loops (Fig. 4) are considered:

Loop 1 corresponds to the evolution of objective function J for an optimization performed with geostatistical realization z1 and two other randomly selected realizations. The optimization algorithm is initialized with θ=0;

Loop 2 corresponds to the optimization performed with realization z1 and the realizations having the refinement indicators of largest absolute value in the set considered. The optimization algorithm is initialized with θ=0;

Loop 3 is similar to loop 2 regarding the realizations selected. The optimization algorithm is initialized using the values of the indicators (see previous paragraph); and Loop 4 corresponds to the optimization performed with realization z1 and the realizations having the refinement indicators of smallest absolute value in the set considered. The optimization algorithm is initialized with θ=0.

It is determined, in cases 2 and 3 where the method is applied that the cost function decreases very quickly.

The use of the refinement indicators for a priori selection of the geostatistical realizations and for initialization of the optimization algorithm appears to be optimal. The final value of the objective function in the case where the refinement indicators are used for the gradual deformations will be less than or equal to the case where these indicators are not used.

Case 2: Avoid Random Selection of Geostatistical Realization $z_1$

Figure 5:
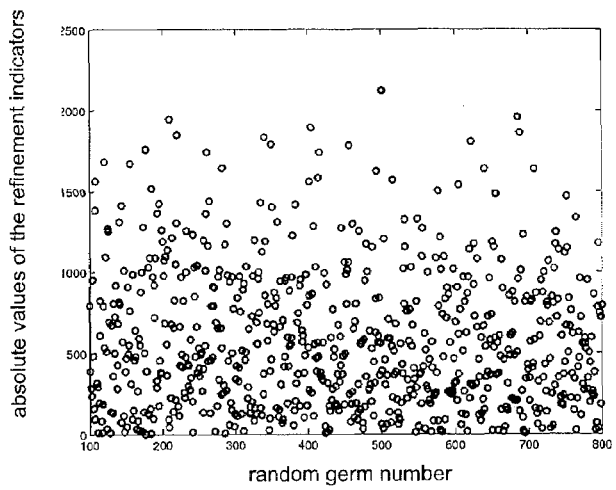
FIG. 5 shows the absolute values of the initialization indicators for the gradual deformations of 700 geostatistical realizations.

Realization z of the zero random variable Z is selected (on which conditioning to the static well data is performed) for which the gradient $\partial J/\partial z$ is calculated. Thereafter generation of a set of 700 geostatistical realizations is performed for which calculation of the corresponding initialization indicators is made (FIG. 5).

Figure 6:
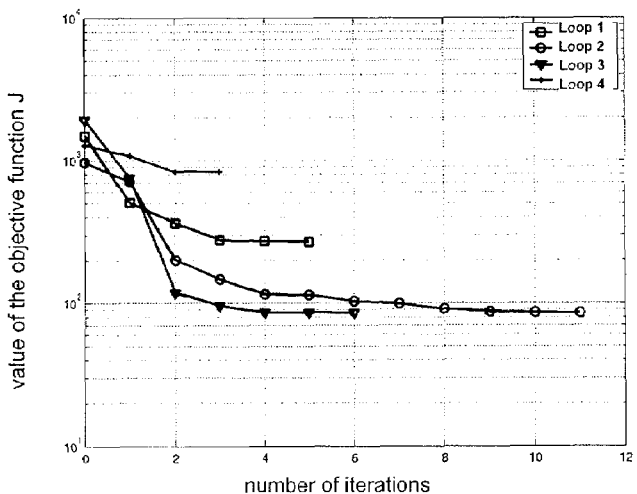
FIG. 6 shows the evolution of objective function J for four optimization loops, the geostatistical realizations used for the gradual deformations being selected or not by the initialization indicators for the gradual deformations.

In order to show the usefulness of the approach, the following four optimization loops (Fig. 6) are considered:

Loop 1 corresponds to the evolution of objective function J for an optimization performed with geostatistical realization z1 and two other randomly selected realizations. The optimization algorithm is initialized with θ=0;

Loop 2 corresponds to the optimization performed with realization z1 and the realizations having the refinement indicators of largest absolute value in the set considered. The optimization algorithm is initialized with θ=0;

Loop 3 is similar to loop 2 as regards the realizations selected. The optimization algorithm is initialized using the values of the indicators (see previous paragraph); and Loop 4 corresponds to the optimization performed with realization z1 and the realizations having the refinement indicators of smallest absolute value in the set considered. The optimization algorithm is initialized with θ=0.

It is determined, in cases 2 and 3 where the method is applied that, the cost function also decreases very quickly.

The invention claimed is:

1. A method for testing a production scenario of a porous heterogeneous medium, by forming a Gaussian stochastic numerical model representing a distribution of a physical quantity in the porous heterogeneous medium, including selecting an initial geostatistical realization of the Gaussian stochastic numerical model, and modifying the initial geostatistical realization, in relation to observed dynamic data in the porous heterogeneous medium and representative of fluid displacement in the porous heterogeneous medium, by an iterative gradual deformation of the initial geostatistical realization, comprising:

generating realizations independent of the initial geostatistical realization;

associating with each of the realizations, a refinement indicator indicating sensitivity of an objective function when the initial geostatistical realization is used for the iterative gradual deformation and the refinement indicator being associated with each realization corresponding to a scalar product between the realization and a geostatistical gradient of the objective function in relation to a geostatistical realization wherein the geostatistical gradient is determined by an adjoint state method;

selecting among the realizations, at least one other realization having the refinement indicator of largest absolute value;

linearly combining, for each iteration, the initial geostatistical realization and the at least one other realization, and applying constraints to linear combination coefficients of the linearly combining of the initial geostatistical realization and the at least one other realization;

using a simulator for calculating dynamic data from the linearly combining for each iteration and calculating and minimizing an objective function measuring a difference between the observed dynamic data and the calculated dynamic data;

iteratively optimizing the linearly combining for each iteration until an optimum realization of the Gaussian stochastic numerical model is obtained, corresponding to a minimum value of the objective function; and testing the production scenario of the porous heterogeneous medium by using the optimum realization.

2. A method as claimed in claim 1, wherein the dynamic data are obtained from measurements performed in the porous heterogeneous medium, or from prior observations.

3. A method as claimed in claim 2, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

4. A method as claimed in claim 2, wherein the refinement indicators are used to initialize an optimization algorithm with optimum and non zero initial gradual deformation parameters.

5. A method as claimed in claim 4, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

6. A method as claimed in claim 1, comprising arbitrarily selecting and conditioning the initial geostatistical realization to the dynamic data.

7. A method as claimed in claim 6, wherein the refinement indicators are used to initialize an optimization algorithm with optimum and non zero initial gradual deformation parameters.

8. A method as claimed in claim 7, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

9. A method as claimed in claim 6, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

10. A method as claimed in claim 1, wherein the initial geostatistical realization is selected, among the realizations, as having the refinement indicator with a largest absolute value, other realizations corresponding to following indicators of a largest absolute value, and the refinement indicator associated with a realization.

11. A method as claimed in claim 10, wherein the refinement indicators are used to initialize an optimization algorithm with optimum and non zero initial gradual deformation parameters.

12. A method as claimed in claim 11, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

13. A method as claimed in claim 10, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

14. A method as claimed in claim 1, wherein the geostatistical gradient is calculated by a transition facies technique, when the physical quantity is discontinued.

15. A method as claimed in claim 14, wherein the refinement indicators are used to initialize an optimization algorithm with optimum and non zero initial gradual deformation parameters.

16. A method as claimed in claim 15, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

17. A method as claimed in claim 14, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

18. A method as claimed in claim 1, wherein the refinement indicators are used to initialize an optimization algorithm with optimum and non zero initial gradual deformation parameters.

19. A method as claimed in claim 18, wherein, when the linearly combining for each iteration affects only part of the initial realization, the iterative gradual deformation is applied to a Gaussian white noise used to generate a Gaussian realization, and further comprising determining a geostatistical gradient, comprising a derivative of an objective function in relation to components of the Gaussian white noise.

20. A method as claimed in claim 1, wherein, when the linearly combining for each iteration affects only part of the initial realization, the iterative gradual deformation is applied to a Gaussian white noise used to generate a Gaussian realization, and further comprising determining a geostatistical gradient, derivative of an objective function in relation to components of the Gaussian white noise.

* * * * *